United States Patent
Ullah et al.

(10) Patent No.: US 10,443,443 B2
(45) Date of Patent: Oct. 15, 2019

(54) NON-CONTACTING SEALS FOR GEARED GAS TURBINE ENGINE BEARING COMPARTMENTS

(71) Applicant: United Technologies Corporation, Farmington, CT (US)

(72) Inventors: M. Rifat Ullah, South Windsor, CT (US); Robert E. Peters, Portland, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 574 days.

(21) Appl. No.: 15/455,855

(22) Filed: Mar. 10, 2017

(65) Prior Publication Data

US 2018/0223690 A1    Aug. 9, 2018

Related U.S. Application Data

(63) Continuation-in-part of application No. 15/402,316, filed on Jan. 10, 2017, which is a continuation of
(Continued)

(51) Int. Cl.
*F01D 25/18* (2006.01)
*F01D 11/02* (2006.01)
(Continued)

(52) U.S. Cl.
CPC ............ *F01D 25/186* (2013.01); *F01D 11/02* (2013.01); *F01D 25/166* (2013.01);
(Continued)

(58) Field of Classification Search
CPC ...... F01D 11/02; F01D 25/166; F01D 25/186; F01D 25/162; F01D 25/22; F02C 7/28;
(Continued)

(56) References Cited

U.S. PATENT DOCUMENTS 3,383,033 A   5/1968 Moore
4,613,141 A   9/1986 Heinen
(Continued)

FOREIGN PATENT DOCUMENTS

EP   0297381    1/1989
EP   2977562    1/2016
(Continued)

OTHER PUBLICATIONS

International Search Report and Written Opinion for International Application No. PCT/US2014/020462 dated Aug. 21, 2014.
(Continued)

*Primary Examiner* — Igor Kershteyn
(74) *Attorney, Agent, or Firm* — Carlson, Gaskey & Olds, P.C.

(57) ABSTRACT

A gas turbine engine includes a fan, a compressor section, a combustor, and a turbine section. The engine also includes a rotating element and at least one bearing compartment including a bearing for supporting the rotating element, a seal for resisting leakage of lubricant outwardly of the bearing compartment and for allowing pressurized air to flow from a chamber adjacent the seal into the bearing compartment. A method and section for a gas turbine engine are also disclosed.

20 Claims, 3 Drawing Sheets

Related U.S. Application Data application No. 14/243,003, filed on Apr. 2, 2014, now Pat. No. 9,574,459, which is a continuation of application No. 14/053,648, filed on Oct. 15, 2013, now Pat. No. 8,770,918, which is a continuation of application No. 13/787,919, filed on Mar. 7, 2013, now Pat. No. 8,641,366.

(51) Int. Cl.
| | |
|---|---|
| *F01D 25/16* | (2006.01) |
| *F01D 25/22* | (2006.01) |
| *F02C 7/28* | (2006.01) |
| *F16C 32/06* | (2006.01) |
| *F16J 15/34* | (2006.01) |
| *F16J 15/44* | (2006.01) |
| *F16C 33/72* | (2006.01) |
| *F02C 7/06* | (2006.01) |

(52) U.S. Cl.
CPC .......... *F01D 25/168* (2013.01); *F01D 25/22* (2013.01); *F02C 7/06* (2013.01); *F02C 7/28* (2013.01); *F16C 32/0633* (2013.01); *F16C 33/72* (2013.01); *F16J 15/342* (2013.01); *F16J 15/3412* (2013.01); *F16J 15/441* (2013.01); *F05D 2220/32* (2013.01); *F05D 2240/50* (2013.01); *F16C 2360/23* (2013.01); *Y02T 50/671* (2013.01)

(58) Field of Classification Search
CPC .............. F16C 32/0633; F16C 2360/23; F16C 2360/33; F16C 2360/72; F16J 15/3412; F16J 15/342; F16J 15/441; F05D 2220/32; F05D 2240/50; Y02T 50/671
See application file for complete search history.

(56) References Cited

U.S. PATENT DOCUMENTS

| | | |
|---|---|---|
| 5,174,584 A | 12/1992 | Lahrman |
| 5,224,714 A | 7/1993 | Kimura et al. |
| 5,284,347 A | 2/1994 | Pope |
| 5,454,572 A | 10/1995 | Pospisil |
| 6,145,843 A | 11/2000 | Hwang |
| 8,162,322 B2 | 4/2012 | Flaherty |
| 8,641,366 B1 | 2/2014 | Ullah et al. |
| 2008/0100001 A1 | 5/2008 | Flaherty |
| 2008/0310953 A1 | 12/2008 | Garrison |
| 2009/0047124 A1 | 2/2009 | Glahn et al. |
| 2009/0051120 A1 | 2/2009 | Munsell |
| 2012/0280458 A1 | 11/2012 | Artiles et al. |
| 2013/0259660 A1* | 10/2013 | Dale ................. F16J 15/445 415/170.1 |
| 2015/0285152 A1* | 10/2015 | Hayford ............... F02C 7/28 415/171.1 |
| 2015/0322816 A1* | 11/2015 | Schmitz ............... F01D 1/04 60/796 |
| 2015/0354455 A1* | 12/2015 | Suciu .................. F02C 3/04 60/782 |
| 2016/0003142 A1* | 1/2016 | Sheridan ............ F02C 3/107 60/740 |
| 2016/0369642 A1* | 12/2016 | Himes ............... F01D 11/003 |
| 2017/0130732 A1* | 5/2017 | Schwarz ........... F01D 11/001 |

FOREIGN PATENT DOCUMENTS

| | | |
|---|---|---|
| EP | 3070316 | 9/2016 |
| WO | 2013/180762 A1 | 12/2013 |

OTHER PUBLICATIONS

International Preliminary Report on Patentability for International Application No. PCT/US2014/020462 dated Sep. 17, 2015.
European Search Report for European Application No. 14759956.7 completed Feb. 3, 2016.
The Partial European Search Report for EP Application No. 18161330.8, dated Jul. 25, 2018.
European Search Report for European Application No. 18161330.8 completed Jul. 17, 2018.

* cited by examiner

NON-CONTACTING SEALS FOR GEARED GAS TURBINE ENGINE BEARING COMPARTMENTS

CROSS-REFERENCE TO RELATED APPLICATION

This application is a continuation-in-part of U.S. application Ser. No. 15/402,316, filed Jan. 10, 2017, which is a continuation in part of U.S. application Ser. No. 14/243,003, filed Apr. 2, 2014, which is a continuation of U.S. application Ser. No. 14/053,648, filed Oct. 15, 2013, which is a continuation of U.S. application Ser. No. 13/787,919, filed Mar. 7, 2013.

BACKGROUND

Gas turbine engines are known and, when utilized in aircraft applications, typically include a fan delivering air into a bypass duct and into a core engine flow. The core engine flow passes into a compressor where the air is compressed and then delivered into a combustion section. The air is mixed with fuel in the combustion section and ignited. Products of that combustion pass downstream over turbine rotors, driving them to rotate.

Historically, a fan drive turbine drove the fan through a direct drive, such that they rotated at the same speed. This restricted the speed available for the fan drive turbine, as the fan speed was limited.

More recently, it has been proposed to include a gear reduction between the fan drive turbine and the fan. With this change, the speed of the fan drive turbine can increase.

In gas turbine engines, there are a number of bearing compartments which are desirably sealed. In the prior art, operating at slower speeds, contact seals have been utilized, which directly contacted surfaces rotating with the shaft to seal the bearing compartments. Such contact seals were typically cooled using oil or other lubricant, which was circulated through a cooling system. For geared engines, in which certain components are enabled to rotate faster than corresponding components in non-geared engines, to achieve the same amount of cooling a larger volume of lubricant would be needed. Moreover, a larger volume of lubricant would require a larger holding tank and correspondingly larger cooling system fluid pumping apparatus. All of the larger volume of lubricant, the larger holding tank, and the larger fluid pumping apparatus would add undesirable weight to the engine.

SUMMARY

A seal arrangement for a bearing compartment of a gas turbine engine according to an example of the present disclosure includes a rotating element and at least one bearing compartment that has a bearing for supporting the rotating element. The rotating element is rotatable about an axis. The bearing compartment has a first seal and a second seal each associated with a corresponding one of two opposed axial ends, on either axial side of the bearing relative to the axis. The first seal and the second seal are a non-contacting seal that have a seal face facing a rotating face of the rotating element. A radially outermost location of the bearing compartment defines a compartment radius with respect to the axis. A radial outermost location of the non-contacting seal establishes a seal radius with respect to the engine axis, and a compartment-seal ratio defined by the compartment radius to the seal radius is less than or equal to 6:1.

In a further embodiment of any of the foregoing embodiments, the non-contacting seal is arranged to resist leakage of lubricant outwardly of the at least one bearing compartment and to allow pressurized air to flow from a chamber adjacent the non-contacting seal into the at least one bearing compartment, and a grooved area is formed in one of the faces, with the grooved area having a plurality of circumferentially spaced grooves for generating hydrodynamic lift-off forces and allowing leakage of pressurized air across the faces and into the at least one bearing compartment to resist leakage of lubricant from the at least one bearing compartment.

In a further embodiment of any of the foregoing embodiments, the rotating element is configured to rotate at a velocity greater than or equal to 450 feet per second.

In a further embodiment of any of the foregoing embodiments, the non-contacting seal is formed with a plurality of passages configured to allow tapping of additional pressurized air to be delivered to the faces at a location in the proximity of the grooved area for generating hydrostatic lift-off forces.

In a further embodiment of any of the foregoing embodiments, the grooved area is spaced radially from the plurality of passages at the seal face.

In a further embodiment of any of the foregoing embodiments, the rotating element is a shaft rotatable with a rotor having an axial face facing the seal face, and the grooved area is formed in the rotor.

In a further embodiment of any of the foregoing embodiments, the non-contacting seal is a controlled gap carbon seal having a full hoop seal and a metal band shrunk fit onto the non-contacting seal, and positioned in a seal carrier.

In a further embodiment of any of the foregoing embodiments, the rotating element is a shaft rotatable with a rotor having an axial face facing the seal face.

In a further embodiment of any of the foregoing embodiments, the rotating element is configured to rotate at a velocity greater than or equal to 450 feet per second.

In a further embodiment of any of the foregoing embodiments, the compartment-seal ratio is between 3:1 to 5:1.

In a further embodiment of any of the foregoing embodiments, the rotating element is configured to rotate at a velocity less than or equal to 600 feet per second.

A gas turbine engine according to an example of the present disclosure includes a fan section having a plurality of fan blades, a gear arrangement, a compressor section, and a turbine section arranged along an engine axis. The turbine section includes a first turbine and a second turbine. The second turbine is configured to drive the fan section through the gear arrangement. A seal arrangement includes a rotating element and at least one bearing compartment that has a bearing for supporting the rotating element. The bearing compartment has a first seal and a second seal each associated with a corresponding one of two opposed axial ends, on either axial side of the bearing relative to the engine axis, at least one of the first seal and the second seal is a non-contacting seal that has a seal face facing a rotating face of the rotating element. A radially outermost location of the fan blades defines a fan radius with respect to the engine axis. A radially outermost location of the bearing compartment defines a compartment radius with respect to the engine axis, and a fan-compartment ratio defined by the fan radius to the compartment radius is greater than or equal to 2:1.

In a further embodiment of any of the foregoing embodiments, the first turbine is configured to drive the rotating element.

In a further embodiment of any of the foregoing embodiments, a radially outermost location of the bearing compartment defines a compartment radius with respect to the engine axis, a radial outermost location of at least one of the first and second seals establishes a seal radius with respect to the engine axis, and a compartment-seal ratio defined by the compartment radius to the seal radius is less than or equal to 6:1.

In a further embodiment of any of the foregoing embodiments, the rotating element is configured to rotate at a velocity greater than or equal to 450 feet per second.

In a further embodiment of any of the foregoing embodiments, a grooved area is formed in one of the faces, with the grooved area having a plurality of circumferentially spaced grooves for generating hydrodynamic lift-off forces and allowing leakage of pressurized air across the faces and into the at least one bearing compartment to resist leakage of lubricant from the at least one bearing compartment.

In a further embodiment of any of the foregoing embodiments, the rotating element is configured to rotate at a velocity between 450 feet per second and 600 feet per second.

A method of operating a gas turbine engine according to an example of the present disclosure includes the steps of arranging a bearing within a bearing compartment to support a rotating element. The rotating element defines a rotating face. The bearing compartment has a first seal and a second seal each associated with a corresponding one of two opposed axial ends relative to an engine axis, on either axial side of the bearing. The method includes rotating the rotating face relative to at least one of the first seal and the second seal, and sealing the bearing compartment with the first seal and the second seal. The first seal and the second seal are a non-contacting seal configured to resist leakage of lubricant outwardly of the bearing compartment and to allow air to flow from a chamber adjacent the non-contacting seal and into the bearing compartment. The non-contacting seal defines a seal face facing the rotating face. A radially outermost location of the bearing compartment defines a compartment radius with respect to the engine axis. A radial outermost location of the non-contacting seal establishes a seal radius with respect to the engine axis, and a ratio of the compartment radius to the seal radius is less than or equal to 6:1.

In a further embodiment of any of the foregoing embodiments, the rotating element is a shaft rotatable with a rotor having an axial face facing the seal face.

A further embodiment of any of the foregoing embodiments includes communicating air from a fan to a bypass passage and to a compressor section. A bypass ratio is defined as the volume of air passing into the bypass passage compared to the volume of air passing into the compressor section. The bypass ratio is greater than 10 at a cruise condition. The step of rotating includes rotating the rotating element at a velocity greater than or equal to 450 feet per second, with the rotating element driving the compressor section.

A gas turbine engine according to an example of the present disclosure includes a fan, a compressor section, a combustor, and a turbine section, a rotating element and at least one bearing compartment including a bearing for supporting the rotating element, a seal for resisting leakage of lubricant outwardly of the bearing compartment and for allowing pressurized air to flow from a chamber adjacent the seal into the bearing compartment. The seal has a seal face facing a rotating face rotating with the rotating element, and the seal is a non-contact seal. The bearing compartment has a seal associated with each of two opposed axial ends on either axial side of the bearing.

In a further embodiment of the foregoing embodiment, a grooved area is formed in one of the faces. The grooved area has a plurality of circumferentially spaced grooves for generating hydrodynamic lift-off forces and allows leakage of pressurized air across the faces and into the bearing compartment to resist leakage of lubricant from the bearing compartment.

In a further embodiment of either of the foregoing embodiments, the seal is formed with a plurality of passages to allow tapping of additional pressurized air to be delivered to the faces at a location in the proximity of the grooved area for generating hydrostatic lift-off forces.

In a further embodiment of any of the foregoing embodiments, the grooved area is spaced radially from the plurality of passages at the seal face.

In a further embodiment of any of the foregoing embodiments, each of the plurality of passages is positioned radially outward of the grooved area.

In a further embodiment of any of the foregoing embodiments, the rotating element is a shaft rotating with a rotor having an axial face facing the seal face.

In a further embodiment of any of the foregoing embodiments, the grooved area is formed in the rotor.

In a further embodiment of any of the foregoing embodiments, the turbine section includes a fan drive turbine driving the fan through a gear reduction. The rotating element is driven by the fan drive turbine. At least one bearing compartment is associated with the gear reduction.

In a further embodiment of any of the foregoing embodiments, the seal is a carbon seal.

In a further embodiment of any of the foregoing embodiments, the rotating element is a shaft rotating with a rotor having a circumferential face facing the seal face.

In a further embodiment of any of the foregoing embodiments, the seal face faces radially inwardly.

In a further embodiment of any of the foregoing embodiments, a grooved area is formed in one of the faces, with the grooved area having a plurality of circumferentially spaced grooves for generating hydrodynamic lift-off forces and allowing leakage of pressurized air across the faces and into the bearing compartment to resist leakage of lubricant from the bearing compartment.

In a further embodiment of any of the foregoing embodiments, the grooved area is formed in the rotor.

In a further embodiment of any of the foregoing embodiments, the seal is a circumferentially segmented carbon seal.

In a further embodiment of any of the foregoing embodiments, the seal is a controlled gap carbon seal having a full hoop seal and a metal band shrunk fit onto the seal, and positioned in a seal carrier.

In a further embodiment of any of the foregoing embodiments, the rotating element is driven by a fan drive turbine. At least one bearing compartment is associated with a gear reduction for driving the fan.

A method of designing a section of a gas turbine engine according to an example of the present disclosure includes configuring a bearing compartment to include a bearing designed to support a rotating element, configuring the rotating element to define a rotating face, the rotating face configured to rotate with said rotating element, configuring the bearing compartment to include a seal designed to resist leakage of lubricant outwardly of the bearing compartment and to allow air to flow from a chamber adjacent the seal and into the bearing compartment configuring the seal to define a seal face facing the rotating face, designing the seal to be a non-contact seal, and configuring the bearing compartment to have a seal associated with each of two opposed axial ends, on either axial side of said bearing.

A further embodiment of the foregoing embodiment includes the step of designing the faces to define a grooved area in one of the faces. The grooved area has a plurality of circumferentially spaced grooves for generating hydrodynamic lift-off forces and allows leakage of pressurized air across the faces and into the bearing compartment to resist leakage of lubricant from the bearing compartment.

In a further embodiment of either of the foregoing embodiments, the rotating element is designed to be a shaft rotating with a rotor having an axial face facing the seal face.

In a further embodiment of any of the foregoing embodiments, the grooved area is formed in the rotor.

A further embodiment of any of the foregoing embodiments includes the step of designing the seal to define a plurality of passages to allow tapping of additional pressurized air to be delivered to the faces at a location in the proximity of the grooved area for generating hydrostatic lift-off forces.

In a further embodiment of any of the foregoing embodiments, the rotating element is designed to be a shaft rotating with a rotor having a circumferential face facing the seal face.

In a further embodiment of any of the foregoing embodiments, the seal is designed to be a controlled gap carbon seal having a full hoop seal and a metal band shrunk fit onto the seal, and positioned in a seal carrier.

A section for a gas turbine engine according to an example of the present disclosure includes a rotating element and at least one bearing compartment configured to be secured to a static structure. The bearing compartment includes a bearing for supporting the rotating element and a seal for resisting leakage of lubricant outwardly of the bearing compartment and for allowing pressurized air to flow from a chamber across the seal into the bearing compartment. The seal has a seal face facing a rotating face rotating with the rotating element. The seal is a non-contact seal where the bearing compartment has a seal associated with each of two opposed axial ends, on either axial side of the bearing.

In a further embodiment of the foregoing embodiment, a grooved area is formed in one of the faces. The grooved area has a plurality of circumferentially spaced grooves for generating hydrodynamic lift-off forces and allows leakage of pressurized air across the faces and into the bearing compartment to resist leakage of lubricant from the bearing compartment.

In a further embodiment of either of the foregoing embodiments, the seal is formed with a plurality of passages to allow tapping of additional pressurized air to be delivered to the faces at a location in the proximity of the grooved area for generating hydrostatic lift-off forces.

In a further embodiment of any of the foregoing embodiments, the rotating element is a shaft rotating with a rotor having an axial face facing the seal face.

In a further embodiment of any of the foregoing embodiments, the rotating element is a shaft rotating with a rotor having a circumferential face facing the seal face.

In a further embodiment of any of the foregoing embodiments, the seal is a circumferentially segmented carbon seal.

In a further embodiment of any of the foregoing embodiments, the seal is a controlled gap carbon seal having a full hoop seal and a metal band shrunk fit onto the seal, and positioned in a seal carrier.

These and other features may be best understood from the following drawings and specification.

DETAILED DESCRIPTION

Figure 1:
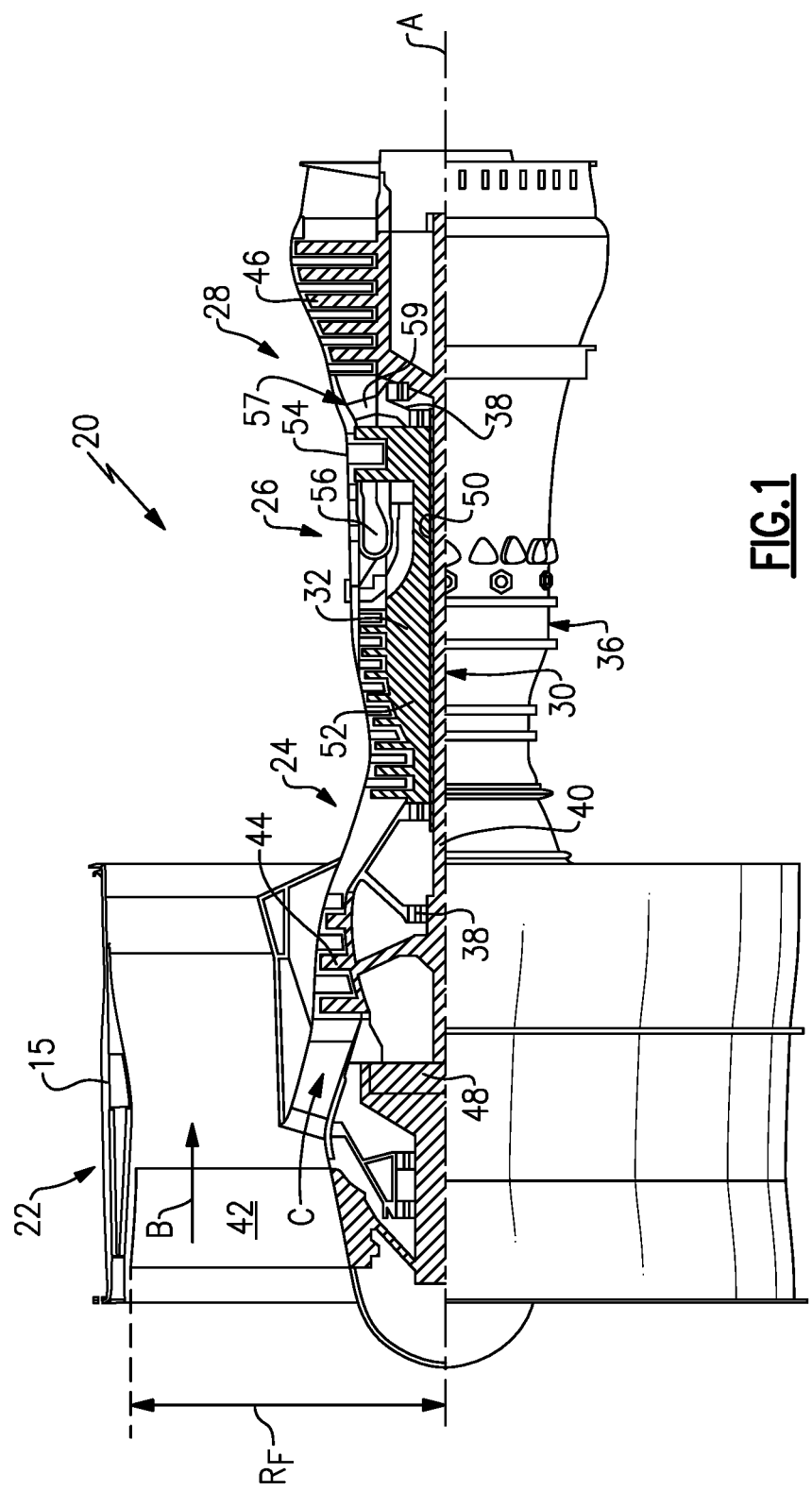
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. A radially outermost location of the fan blades of the fan 42 establishes a radius $R_F$ relative to the engine central longitudinal axis A. In some embodiments, radius $R_F$ is between about 28 inches and about 40.5 inches. In an embodiment, the radius $R_F$ is about 36.5 inches. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and geared architecture 48 may be varied. For example, geared architecture 48 may be located aft of combustor section 26 or even aft of turbine section 28, and fan section 22 may be positioned forward or aft of the location of geared architecture 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicyclic gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram}° \text{ R})/(518.7° \text{ R})]^{0.5}$. The "Low corrected fan tip speed" as disclosed herein according to one non-limiting embodiment is less than about 1150 ft/second.

Figure 2A:
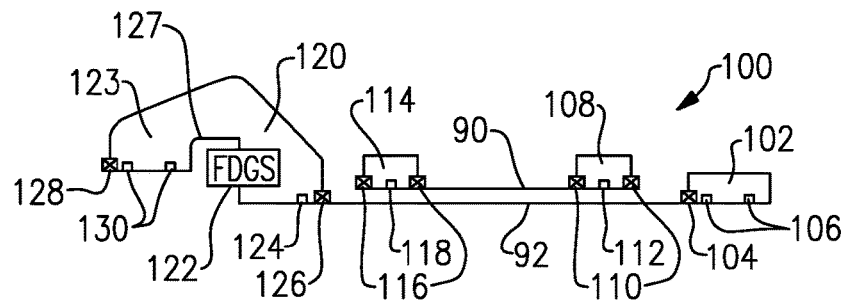
FIG. 2A schematically shows example locations of bearing compartments.

FIG. 2A shows an embodiment of an arrangement of bearing compartments 100 associated with the gas turbine engine, such as the gas turbine engine 20 illustrated in FIG. 1. As shown, a bearing compartment 102 is associated with a low speed shaft 92 at a location associated with the low pressure turbine. Bearings 106 are shown schematically as is a seal 104.

A bearing compartment 108 is associated with a high speed rotor 90 and at the high pressure turbine of FIG. 1. Bearing compartment 108 includes seals 110 at each axial end and a central bearing 112.

Another bearing compartment 114 is also associated with the high speed rotor 90 and the high pressure compressor and includes a bearing 118 and seals 116.

Finally, a bearing compartment is associated with a fan drive gear system 122 at location 120 and with and the fan at location 123. Seals 126 and 128 mechanically seal the axial ends of the bearing compartment 120 and are associated with the fan rotor 127 and the low speed rotor 92. The seals 126, 128 are also respectively associated with the bearings 124 and 130 that are positioned within the bearing compartment 120/123.

Figure 2B:
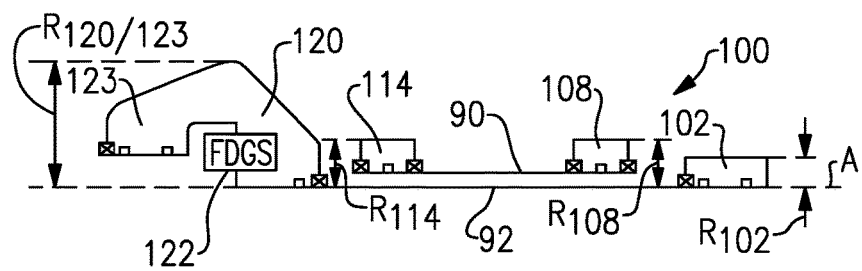
FIG. 2B schematically shows dimensional aspects of the bearing compartments of FIG. 2A.

Referring to FIG. 2B, the bearing compartments 102, 108, 114, 120/123, establish a dimensional relationship with respect to the engine central longitudinal axis A. A radially outermost location of bearing compartments 102, 108, 114, 120/123 establish corresponding radii $R_{102}$, $R_{108}$, $R_{114}$ and $R_{120/123}$.

Utilizing the seal arrangements disclosed herein, the relative sizes of the bearing compartments 102, 108, 114 and 120/123 can be reduced to provide for a more compact core engine arrangement, which may be utilized with a relatively high bypass ratio. In some embodiments, radii $R_{120, 123}$ and $R_{114}$ establish a compartment ratio that is between about 1:1 to about 2:1. In embodiments, radii $R_{120, 123}$ and $R_{102}$ establish a compartment ratio that is between about 2:1 to about 3:1. In some embodiments, radii $R_{108}$ and $R_{102}$ establish a compartment ratio that is between about 1:1 to about 2:1. For the purposes of this disclosure, the term "about" is relative to the number of significant digits unless otherwise noted.

The sizes of the bearing compartments 102, 108, 114 and 120/123 relative to the fan 42 can also be reduced. In embodiments, radii $R_F$ and radii $R_{120/123}$ establish a fan-compartment ratio that is greater than or equal to about 2:1, such as between about 2.5:1 and about 5:1. In one embodiment, the fan-compartment ratio is about 3:1. In embodiments, radii $R_F$ and radii $R_{114}$ establish a fan-compartment ratio that greater than or equal to about 4:1. In an embodiment, radii $R_F$ and radii $R_{114}$ establish a fan-compartment ratio that is about 5:1. In embodiments, radii $R_F$ and radii $R_{108}$ establish a fan-compartment ratio that greater than or equal to about 8:1, and less than or equal to about 12:1. In an embodiment, radii $R_F$ and radii $R_{108}$ establish a fan-compartment ratio that is about 10:1. In embodiments, radii $R_F$ and radii $R_{102}$ establish a fan-compartment ratio that is greater than or equal to about 12:1, and less than or equal to about 18:1. In an embodiment, radii $R_F$ and radii $R_{102}$ establish a fan-compartment ratio that is about 15:1.

There are challenges with sealing the bearing compartments in a geared turbofan engine. Accordingly, various embodiments disclosed herein relate to the use of non-contacting seals such as lift-off seals at any one or more of the locations of the seals shown in FIG. 2A or in any other bearing compartment on a gas turbine engine. In some embodiments, the seals may be lift-off seals and, more particularly, may be carbon lift-off seals. Of course, in other embodiments other non-contacting seals, including other lift-off seals may be used.

Figure 3A:
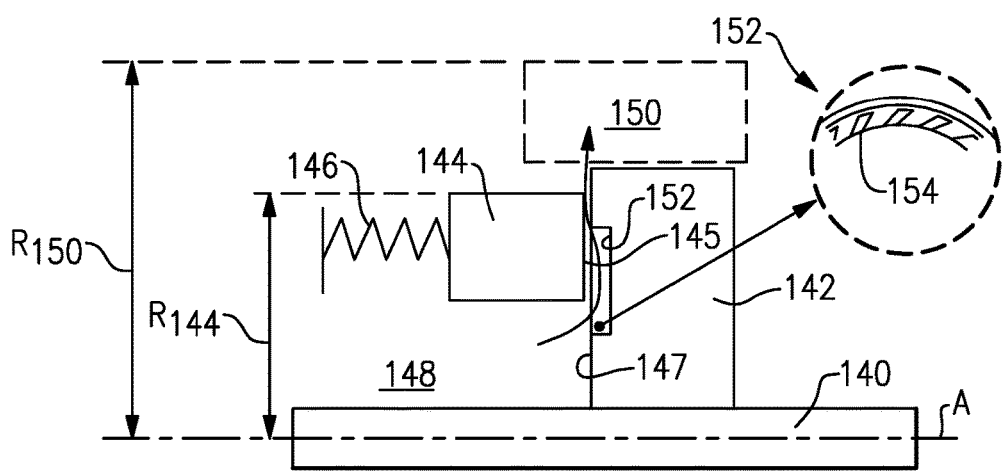
FIG. 3A is a first embodiment of a non-contact seal according to the present invention.

Thus, as shown in FIG. 3A, a shaft 140, which could be any rotating shaft in a gas turbine engine, has a mating rotor 142. An axial face 147 of this mating rotor 142 is sealed relative to a face 145 from a seal 144. The faces 145 and 147 face each other to form a mechanical seal. The seal 144 may be a non-contact seal such as a carbon seal lift-off seal. The interface between faces 145 and 147 experiences high velocities, especially when compared to the prior art. The high velocity is a combination of a high rotational speed of the shaft 140 and a relatively large diameter for the seal 144. Velocities greater than or equal to about 450 feet/second (137.16 meters/second) may be seen.

In the FIG. 3A embodiment seal 144, a set of shallow grooves 152 is provided by cutting into the face 147 of the rotor 142, as shown at circumferentially spaced grooves 154. A spring 146 biases the seal 144 toward the face 147. A higher pressure air is available in a chamber 148, which is on an opposed side of the seal 144 from the bearing compartment 150. The bearing compartment 150 is at a lower pressure than the chamber 148, and this higher pressure air passes through the grooved area 152, such that the air flow levitates (lifts-off) the sealing surface 145 of the non-rotating seal 144 from the sealing surface 147 of the rotor 142. The levitation is a result of hydrodynamic lifting force as the air passes into the bearing compartment 150, preventing oil from escaping the bearing compartment 150.

Figure 3B:
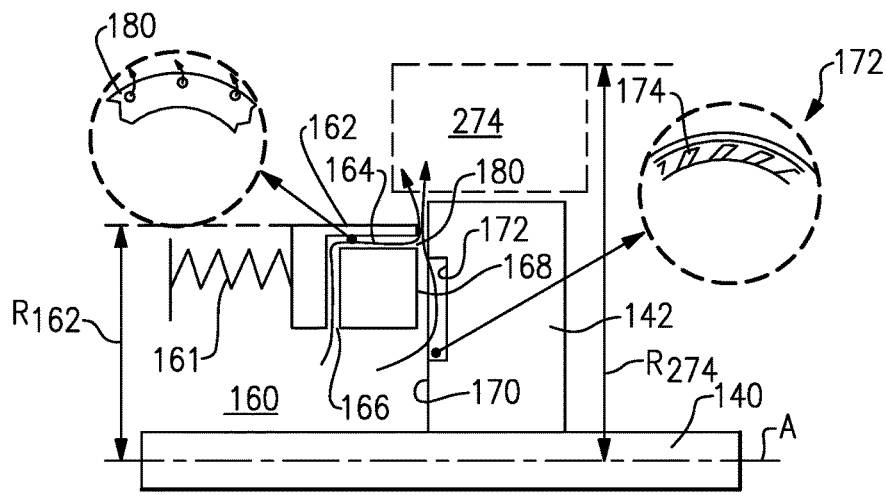
FIG. 3B shows a second embodiment of a non-contact seal according to the present invention.

Another embodiment is illustrated in FIG. 3B. FIG. 3B provides the mechanical sealing between face 168 of a non-rotating seal 162 and a face 170 of a rotor in a manner somewhat similar to the FIG. 3A embodiment. There is a grooved area 172 having circumferentially spaced grooves 174 with the features as described for the first embodiment that generate hydrodynamic lifting force as the gas passes from a high pressure chamber 160 into the bearing compartment 274. Furthermore, the non-rotating seal 162 has an inlet 166, a passage 164, and an outlet 180 which delivers additional high pressure air generating hydrostatic lifting forces at a radial location in the proximity of the grooved area 172, thereby providing a stronger and more stable lift-off seal compared to the first embodiment. As shown, there is a plurality of circumferentially spaced outlets 180. The non-rotating seal 162, which is biased toward the rotor 170 by a spring 161, may be a carbon lift-off seal.

Figure 3C:
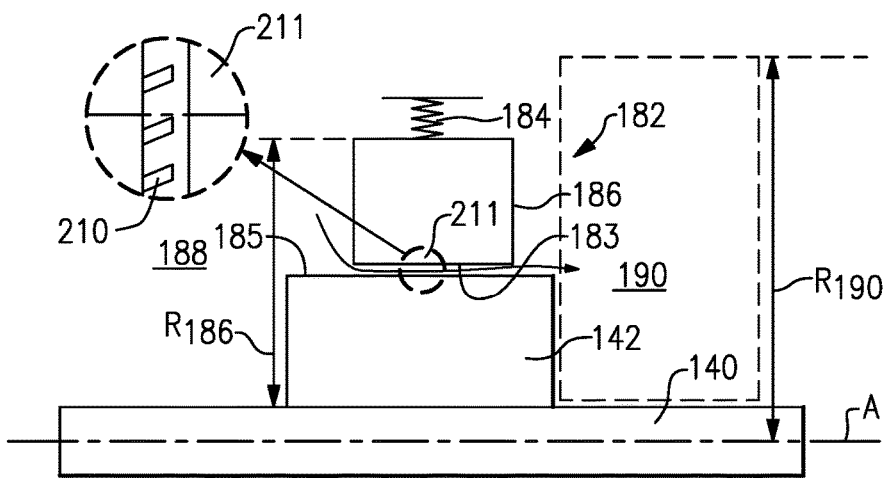
FIG. 3C shows a third embodiment of a non-contact seal according to the present invention.

FIG. 3C shows another embodiment 182, wherein the seal 186 has a plurality of circumferentially segmented members biased by spring 184 toward a face 185 of a rotor 142 rotating with the shaft 140. Seal 186 has a radially inwardly facing face 183 providing the seal face with the mating face 185. One of the sealing faces, either 183 or 185, has a set of shallow, circumferentially spaced grooves 210 in a grooved area 211, somewhat similar to those described in the earlier embodiments that generate a hydrodynamic force that levitates (lifts-off) the non-rotating sealing surface 183 from the rotating mating surface 185 when the high pressure chamber 188 delivers pressurized air across the seal 186 to prevent leakage of oil from the bearing compartment 190.

Figure 3D:
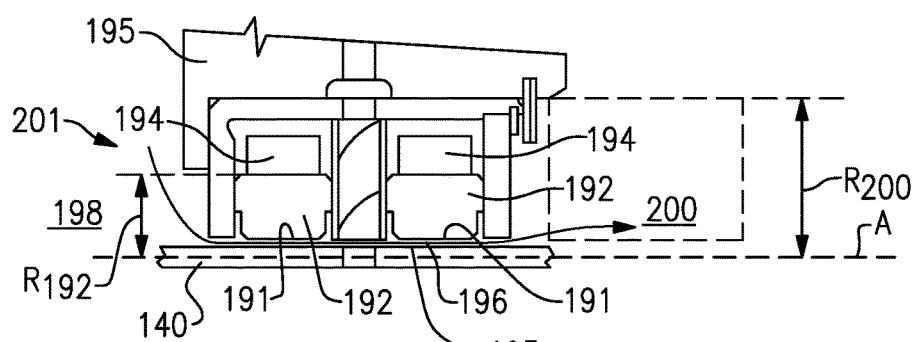
FIG. 3D shows a fourth embodiment of a non-contact seal assembly according to the present invention.

FIG. 3D shows an embodiment of a controlled gap non-contacting seal assembly 201. The shaft 140 has an outer surface spaced by a small gap 196 from two carbon seals 192. The gap is controlled by design, typically by sizing the sealing diameters of the seals 192 and the rotor 142 such that a small gap is maintained under all conditions. The shaft outer surface 193 and a radially inward facing surfaces 191 of the seals 192 provide the seal faces. In one embodiment, the carbon seals 192 are full hoop members extending around the entire circumference of the shaft 140. A metal band 194 is shrunk fit onto the seal 192. A carrier 195 mounts the seals 192. A high pressure chamber 198 is spaced from the bearing compartment 200, such that high pressure air passes through the gap 196 to prevent the leakage of lubricant.

The seal arrangements disclosed herein can be utilized to reduce the relative sizes of the bearing compartments to provide for a more compact core engine arrangement. The seals 144, 162, 186, 192 establish a dimensional relationship with engine central longitudinal axis A. A radially outermost location of seals 144, 162, 186, 192 establish corresponding radii $R_{144}$, $R_{162}$, $R_{186}$ and $R_{192}$ with respect to engine axis A (shown in FIGS. 3A-3D, respectively). For the purposes of this disclosure, the radially outermost location of each seal 144, 162, 186, 192 is measured at an outermost position that the seal 144, 162, 186, 192 is permitted to move relative to the engine central longitudinal axis A during normal operation of the engine 20. A radially outermost location of the bearing compartments 150, 274, 190, 200 establish corresponding radii $R_{150}$, $R_{274}$, $R_{190}$ and $R_{200}$ with respect to engine axis A (shown in FIGS. 3A-3D, respectively). For the purposes of this disclosure, the radially outermost location of each bearing compartment 150, 274, 190, 200 is measured at an inner surface of the cavity of the bearing compartment 150, 274, 190, 200 housing the respective bearing(s).

In embodiments, radii $R_{150/274/190/200}$ and $R_{144/162/186/192}$ establish a compartment-seal ratio that is less than or equal to about 6:1. In some embodiments, the compartment-seal ratio is between about 3:1 and about 5:1.

As previously discussed, the interface between the shaft or rotor and seal(s) may operate at relatively high velocities. In embodiments, the interface between the faces of the shaft 140 or rotor 142 and seal(s) 144/162/186/192 is configured to operate at relative velocities greater than or equal to about 450 feet/second. In some embodiments, the interface operates at relative velocities less than or equal to about 600 feet/second, and more narrowly less than or equal to about 550 feet/second. In embodiments, the shaft 140 corresponds to the high speed rotor 90 (FIG. 2A).

In other embodiments, the interface between the faces of the shaft 140 or rotor 142 and seal(s) 144/162/186/192 is configured to operate at relative velocities less than or equal to about 450 feet/second, such as between about 400 to about 450 feet/second. In embodiments, the shaft 140 corresponds to the low speed rotor 92 (FIG. 2A). In other embodiments, the shaft 140 corresponds to the fan rotor 127 (FIG. 2A). In some embodiments, the interface between the faces of the shaft 140 or rotor 142 and seal(s) 144/162/186/192 is configured to operate at relative velocities between about 200 to about 400 feet/second.

In some embodiments, a velocity of the high speed rotor 90 and the low speed rotor 92 establish a ratio that is between about 1:1 to about 2:1. In embodiments, a velocity of the high speed rotor 90 and the fan rotor 127 establish a ratio that is between about 5:2 to about 3:1, with the fan rotor 127 driven by the fan drive gear system 122.

All of the disclosed embodiments reduce the friction between the seal and the rotating components. This reduces heat generation due to friction, increases the durability of the seals, minimizes loss of oil, and increases the efficiency in fuel consumption of the overall engine. Moreover, as a result of the reduction in friction, less lubricant can be used, thereby also reducing the size of the applicable fluid storage tank (not shown) and the applicable cooling system fluid pumping apparatus (also not shown). Accordingly, the overall weight of the engine may be greatly reduced, thereby increasing the engine's fuel efficiency.

The disclosed embodiments may be useful at any bearing compartment in a gas turbine engine. Although shafts are shown supported by the bearings, the disclosure would extend to other rotating elements supported by a bearing.

Although various embodiments of this invention have been disclosed, a worker of ordinary skill in this art would recognize that certain modifications would come within the scope of this invention. For that reason, the following claims should be studied to determine the true scope and content of this invention.

The invention claimed is:

1. A seal arrangement for a bearing compartment of a gas turbine engine comprising:
    a rotating element and at least one bearing compartment including a bearing for supporting said rotating element, said rotating element rotatable about an axis;
    wherein said at least one bearing compartment has a first seal and a second seal each associated with a corresponding one of two opposed axial ends, on either axial side of said bearing relative to said axis, at least one of said first seal and said second seal being a non-contacting seal having a seal face facing a rotating face of said rotating element; and
    wherein a radially outermost location of said bearing compartment defines a compartment radius with respect to said axis, a radial outermost location of said non-contacting seal establishes a seal radius with respect to the engine axis, and a compartment-seal ratio defined by said compartment radius to said seal radius is less than or equal to 6:1.

2. The seal arrangement as set forth in claim 1, wherein said non-contacting seal is arranged to resist leakage of lubricant outwardly of said at least one bearing compartment and to allow pressurized air to flow from a chamber adjacent said non-contacting seal into said at least one bearing compartment, and a grooved area is formed in one of said faces, with said grooved area having a plurality of circumferentially spaced grooves for generating hydrodynamic lift-off forces and allowing leakage of pressurized air across said faces and into said at least one bearing compartment to resist leakage of lubricant from said at least one bearing compartment.

3. The seal arrangement as set forth in claim 2, wherein said rotating element is configured to rotate at a velocity greater than or equal to 450 feet per second.

4. The seal arrangement as set forth in claim 2, wherein said non-contacting seal being formed with a plurality of passages configured to allow tapping of additional pressurized air to be delivered to said faces at a location in the proximity of said grooved area for generating hydrostatic lift-off forces.

5. The seal arrangement as set forth in claim 4, wherein said grooved area is spaced radially from said plurality of passages at said seal face.

6. The seal arrangement as set forth in claim 5, wherein said rotating element is a shaft rotatable with a rotor having an axial face facing said seal face, and said grooved area is formed in said rotor.

7. The seal arrangement as set forth in claim 2, wherein said non-contacting seal is a controlled gap carbon seal having a full hoop seal and a metal band shrunk fit onto said non-contacting seal, and positioned in a seal carrier.

8. The seal arrangement as set forth in claim 2, wherein said rotating element is a shaft rotatable with a rotor having an axial face facing said seal face.

9. The seal arrangement as set forth in claim 1, wherein said rotating element is configured to rotate at a velocity greater than or equal to 450 feet per second.

10. The seal arrangement as set forth in claim 9, wherein said compartment-seal ratio is between 3:1 to 5:1.

11. The seal arrangement as set forth in claim 9, wherein said rotating element is configured to rotate at a velocity less than or equal to 600 feet per second.

12. A gas turbine engine comprising:
    a fan section having a plurality of fan blades, a gear arrangement, a compressor section, and a turbine section arranged along an engine axis, said turbine section including a first turbine and a second turbine, said second turbine configured to drive said fan section through said gear arrangement;
    a seal arrangement comprising:
        a rotating element and at least one bearing compartment including a bearing for supporting said rotating element;
        wherein said at least one bearing compartment has a first seal and a second seal each associated with a corresponding one of two opposed axial ends, on either axial side of said bearing relative to said engine axis, at least one of said first seal and said second seal being a non-contacting seal having a seal face facing a rotating face of said rotating element; and
    wherein a radially outermost location of said fan blades define a fan radius with respect to said engine axis, a radially outermost location of said bearing compartment defines a compartment radius with respect to said engine axis, and a fan-compartment ratio defined by said fan radius to said compartment radius is greater than or equal to 2:1.

13. The gas turbine engine as set forth in claim 12, wherein said first turbine is configured to drive said rotating element.

14. The gas turbine engine as set forth in claim 12, wherein a radially outermost location of said bearing compartment defines a compartment radius with respect to said engine axis, a radial outermost location of at least one of said first and second seals establishes a seal radius with respect to the engine axis, and a compartment-seal ratio defined by said compartment radius to said seal radius is less than or equal to 6:1.

15. The gas turbine engine as set forth in claim 14, wherein said rotating element is configured to rotate at a velocity greater than or equal to 450 feet per second.

16. The gas turbine engine as set forth in claim 15, wherein a grooved area is formed in one of said faces, with said grooved area having a plurality of circumferentially spaced grooves for generating hydrodynamic lift-off forces and allowing leakage of pressurized air across said faces and into said at least one bearing compartment to resist leakage of lubricant from said at least one bearing compartment.

17. The gas turbine engine as set forth in claim 12, wherein said rotating element is configured to rotate at a velocity between 450 feet per second and 600 feet per second.

18. A method of operating a gas turbine engine, the method comprising the steps of:
    arranging a bearing within a bearing compartment to support a rotating element, said rotating element defining a rotating face, said bearing compartment having a first seal and a second seal each associated with a corresponding one of two opposed axial ends relative to an engine axis, on either axial side of said bearing;
    rotating said rotating face relative to at least one of said first seal and said second seal;

sealing said bearing compartment with said first seal and said second seal, at least one of said first seal and said second seal being a non-contacting seal configured to resist leakage of lubricant outwardly of said bearing compartment and to allow air to flow from a chamber adjacent said non-contacting seal and into said bearing compartment, said non-contacting seal defining a seal face facing said rotating face; and wherein a radially outermost location of said bearing compartment defines a compartment radius with respect to said engine axis, a radial outermost location of said non-contacting seal establishes a seal radius with respect to the engine axis, and a ratio of said compartment radius to said seal radius is less than or equal to 6:1.

19. The method as set forth in claim 18, wherein said rotating element is a shaft rotatable with a rotor having an axial face facing said seal face.

20. The method as set forth in claim 18, comprising:

communicating air from a fan to a bypass passage and to a compressor section, wherein a bypass ratio is defined as the volume of air passing into said bypass passage compared to the volume of air passing into said compressor section, said bypass ratio greater than 10 at a cruise condition; and wherein said step of rotating comprises rotating said rotating element at a velocity greater than or equal to 450 feet per second, with said rotating element driving said compressor section.

* * * * *